United States Patent [19]

Meister et al.

[11] Patent Number: 4,687,828

[45] Date of Patent: Aug. 18, 1987

[54] WATER SOLUBLE GRAFT COPOLYMERS OF LIGNIN-(2-PROPENAMIDE)-(SODIUM 2,2-DIMETHYL-3-IMINO-4-OXOHEX-5-ENE-1-SULFONATE), METHODS OF MAKING THE SAME AND USES THEREFOR

[75] Inventors: John J. Meister, Dallas, Tex.; Damodar R. Patil, Gainsville, Fla.

[73] Assignee: Southern Methodist University, Dallas, Tex.

[21] Appl. No.: 771,270

[22] Filed: Aug. 30, 1985

[51] Int. Cl.$^4$ .......................... C08L 97/00; C08H 5/02
[52] U.S. Cl. ..................................... 527/400; 527/401
[58] Field of Search ......................... 527/400, 401, 403

[56] References Cited

U.S. PATENT DOCUMENTS 3,388,061  6/1968  Markham ........................... 527/403
3,912,706 10/1975  Rachor et al. ..................... 527/403

Primary Examiner—Allan M. Lieberman
Attorney, Agent, or Firm—Oblon, Fisher, Spivak, McClelland & Maier

[57] ABSTRACT

A water-soluble graft copolymer of lignin-(2-propenamide)-(sodium 2,2-dimethyl-3-imino-4-oxohex-5-ene-1-sulfonate) having a central lignin network and at least one grafted side chain, R, having randomly repeating units of the formula:

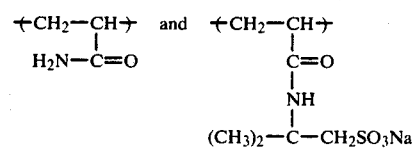

such that the central lignin network has a molecular weight of about 1,000 to 100,000 and the total number of randomly repeating units in the grafted side chain or chains is in the range of 1,000 to 300,000, such that the total copolymer molecular weight is in the range of 40,000 to 30,000,000.

The copolymers of the present invention are useful as thickeners for water and aqueous solutions and may be advantageously used in the recovery of oil from subterranean wells or in the preparation and use of drilling fluid compositions.

6 Claims, No Drawings

WATER SOLUBLE GRAFT COPOLYMERS OF LIGNIN-(2-PROPENAMIDE)-(SODIUM 2,2-DIMETHYL-3-IMINO-4-OXOHEX-5-ENE-1-SULFONATE), METHODS OF MAKING THE SAME AND USES THEREFOR

BACKGROUND OF THE INVENTION

1. Field of the Invention

The present invention relates to water-soluble graft copolymers of lignin-(2-propenamide)-(sodium 2,2-dimethyl-3-imino-4-oxohex-5-ene-1-sulfonate), methods of making the same and uses therefor.

2. Description of the Background

Aqueous solutions which flow at a controlled rate under a given shear stress are required throughout a variety of industrial applications. Such control of viscosity of water is achieved by adding to water agents such as clays, large amounts of polar organic compounds such as polyacrylates or high concentrations of salts. These aqueous solutions suspend finely divided solids and will flow slowly when exposed to shear stress. Such solutions also flow more uniformly in situations where numerous paths providing different resistances to flow are open to the fluids.

However, each of these conventional agents has attendant disadvantages. Hence, a need continues to exist for new agents which are capable of suitably thickening water and aqueous solutions to produce aqueous solutions having the above-described desirable properties but which are free of attendant disadvantages.

SUMMARY OF THE INVENTION

Accordingly, it is an object of the present invention to provide a lignin graft copolymer.

It is also an object of the present invention to provide processes for preparing the lignin graft copolymer.

Moreover, it is also an object of this invention to provide a method for using the above lignin graft copolymer in preparing highly viscous, aqueous solutions which are particularly useful in oil recovery from subterranean wells.

Further, it is also an object of the present invention to provide a method of boosting or enhancing polymer molecular weights during polymerization reactions.

According to the present invention, the foregoing and other objects are attained by providing a water-soluble graft copolymer of lignin-(2-propenamide)(sodium 2,2-dimethyl-3-imino-4-oxohex-5-ene-1-sulfonate) having a central lignin network and at least one grafted side chain, R, having randomly repeating units of the formulas:

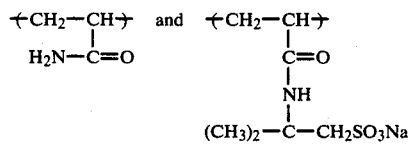

such that the central lignin network has a molecular weight of about 1,000 to 100,000 and the total number of random units in the grafted side chain or chains is in the range of 1,000 to 300,000 units, such that the total copolymer molecular weight is in the range of 40,000 to 30,000,000.

DETAILED DESCRIPTION OF THE PREFERRED EMBODIMENTS

In accordance with the present invention, there is provided a high molecular weight graft copolymer containing lignin as the backbone network and poly ((1-amidoethylene)-co-(1-sodium- (2-methylprop-2N-yl-1-sulfonate)amidoethylene)) as the grafted side chain.

Lignin is derived from woody plants. In fact, after cellulose, it is the principal constituent of the woody structure of higher plants. Lignin, which makes up about 25% of the weight of dry wood, acts as a cementing agent to bind the matrix of cellulose fibers together into a rigid woody structure. See *Biochemistry* by A. L. Lehniger (Worth Publishers, 1970)

Moreover, lignin sources are abundant. Although the wood and bark waste from the lumber industry and wastes from agricultural operations could provide extremely large quantities of lignin, perhaps the most accessible, albeit smaller, source is the pulp and paper industry. For example, in 1978, it has been estimated that the U.S. chemical-pulp industry produced $1.55 \times 10^7$ tons of alkali lignin and $1.6 \times 10^6$ tons of lignosulfonic acids. See *Encyclopedia of Chemical Technology*, vol. 14 (Kirk-Othmer, 1981).

In general, the molecular structure of the repeating lignin units and the appropriate numbering thereof is as follows:

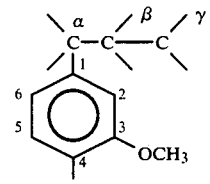

Lignin, apparently regardless of origin, is, in general, a complex, oxyphenylpropene polymer. In the natural state, lignin is a highly branched and partially cross-liked polymer However, there appears to be some structural variation in branching depending upon whether the ligin is derived from coniferous or deciduous species or from bark, cambium, sapwood or heartwood. During recovery, the lignin is chemically altered and is available in relatively pure form as a derivative having a molecular weight of about 1,000 to 100,000. Of the lignins which may be used according to the present invention, there may be mentioned alkali lignins, HCl lignins, milled wood lignins (MWL) and 1,4-dioxane lignins, for example. However, the use of the alkali lignins is preferred. Alkali lignins are produced in the kraft or soda process for paper production. These processes are well-known and have been used by industry for some time.

Alkali lignins are tan, brown or black powders. When free of metal cations such as sodium or potassium, alkali lignins are water-insoluble materials and are commonly called "free acid" or "acid free" lignin. When containing metal cations, such as sodium or potassium, the alkali lignins are slightly water soluble materials which increase in water solubility as the pH increases from 7 toward 14 and become completely soluble in 5 wt. % aqueous sodium hydroxide solutions. Alkali lignins have, as a basic repeating unit, the oxyphenylpropyl units

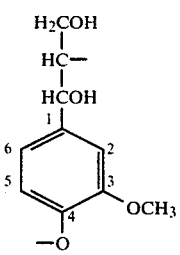

The aromatic ring is often alkoxy substituted, as shown, and the propene group often has a hydroxyl group attached in place of one hydrogen. Alkyl groups appear on some of the aromatic groups of the polymer and sulfur may be chemically bound to parts of the polymer, though few, if any, sulfonate groups occur.

Bonding between repeat units in alkali lignin is complex and involves carbon-carbon bonds between aromatic and/or alkyl carbons as well as ether bonds between aromatic and/or alkyl carbons. Labile hydrogens exist in the material and may be replaced by metal cations, such as sodium, potassium, calcium, or ammonium ions, to form alkali lignin salts. Alkali lignins are readily identified by method of production and are a familiar class of compounds to those versed in the paper making art.

In accordance with the present invention, to the lignin macromolecule, specifically to the aromatic ring of the oxyphenylpropene moiety, is grafted repeating units of 1-amidoethylene:

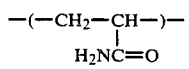

in combination with repeating units of 1-(sodium (2-methylprop-2N-yl-1-sulfonate))amidoethylene:

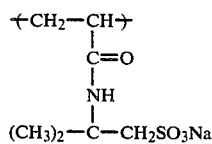

For example, when using alkali lignins in accordance with the present invention, a lignin graft copolymer of the following formula is produced:

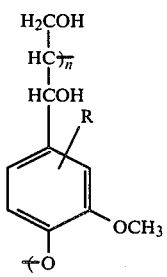

The preparation of this copolymer is accomplished, in general, under oxygen-free conditions by adding a redox initiator, a chloride salt, 2-propenamide, and sodium 2,2-dimethyl-3-imino-4-oxohen-5-ene-1-sulfonate to a lignin dispersion in a suitable solvent and allowing time for graft polymerization to occur Preparation of alkali lignin-(2-propenamide)-(sodium 2,2-dimethyl-3-imino-4-oxohex-5-ene-2-sulfonate) graft copolymer in 1,4-dioxane will now be illustrated for a sample composed of between 0.32 and 3.0 weight percent lignin, 1.2 and 7.6 weight percent 2-propenamide, 0.6 to 15.3 weight percent calcium chloride, 0.16 to 6.1 weight percent aqueous sulfuric acid solution of cerium (+IV), and 60 to 97 weight percent solvent.

Significant variation in reaction mixture composition is possible as will be illustrated in the examples to follow. However, in general, there are two ways to prepare the graft copolymer. These methods will now be described, generally.

As a suitable solvent for the graft copolymerization of the present invention, it should be noted that, in general, organic solvents are used and, of these, the polar, aprotic solvents are preferred. Particularly noteworthy are the solvents dimethyl sulfoxide (DMSO), dimethyl acetamide (DMAc), dimethyl formamide (DMF), 1,4-dioxane, 1-methyl-2-pyrrolidianone and pyridine. Of course, mixtures of these solvents can also be used such as 50/50 (vol/vol) mixtures of DMSO and 1,4-dioxane. However, it is also possible to use 50/50 (vol/vol) mixtures of one of the above solvents, such as DMSO, with water.

In the first method, autophotolysis products are formed in 1,4-dioxane, having oxygen bubbled therethrough, and the reaction is then run in the irradiated dioxane. In the second method, oxidized 1,4-dioxane is vacuum distilled to separate the 1,4-dioxane and its autooxidation products Autooxidation products or a hydroperoxide are then used to initiate the grafting reaction in another suitable solvent Before preparing the graft-copolymer in 1,4-dioxane, the time required to produce a maximum concentration of oxidizing agents in 1,4-dioxane must be determined by irradiating samples of dioxane with a 1,000 w xenon lamp. A 20 mL aliquot of freshly distilled 1,4-dioxane is placed in a 125 mL pyrex erlenmeyer flask and air or oxygen is bubbled therethrough for 5 minutes. The sealed sample is then mounted about 2 to 4 cm. from the lens face of a 1,000 w xenon lamp and is stirred and photolyzed for a fixed time. The sample is then titrated by the iodinethiosulfate method, (Mair and Graupner (1964)), to determine the number of oxidizing equivalents produced by the irradiation. The duration of photolysis which produces the largest number of oxidizing equivalents in 1,4-dioxane is the optimum -photolysis time. This is usually 2.5 to 3.5 hours. 1,4-dioxane containing dissolved oxygen is photolyzed for this length of time to produce solvent for one method of graft copolymer production. This method is as follows:

Synthesis Method 1

An aliquot of 20 mL of distilled 1,4-dioxane is placed in a 125 mL conical flask, with oxygen bubbled therethrough for about 5 minutes, and is exposed to the output of a 1000 w xenon lamp for the optimum photolysis time. Samples undergoing photolysis are mounted about 2 to 4 cm. from the lens face of the lamp housing and are stirred continuously during irradiation. Lignin and finely ground anhydrous calcium chloride are added to the irradiated dioxane solvent and the mixture is stirred for about 20 minutes. Solid 2-propenamide and a nitrogen-saturated dioxane solution of sodium 2,2-dimethyl-3-imino-4-oxohex-5-ene-1-sulfonate are added while nitrogen gas is bubbled into the mixture. After about 10 minutes, a sufficient volume of 0.05 M ceric sulfate in 1.0 M aqueous sulfuric acid is added, the flask is sealed under nitrogen, and the slurry is stirred for 10 more minutes. Thickening starts immediately. The flask contents first clarify into a brown, homogeneous solution and then quickly solidify into a precipitate-laden, viscous slurry.

The reaction flask is placed in a 30° C. bath and allowed to sit for two days. The reaction is then terminated with 0.5 mL of 1 wt % of hydroquinone in water. The reaction mixture is diluted with 100 mL of water and stirred until a uniform reaction product is precipitated by adding the dilute reaction mixture dropwise to 1 liter of 2-propanone. The solid is recovered from 1-propanone by filtration and dried under vacuum at 40° C. Yield is calculated from the formula: (g=grams)

$$\text{weight percent yield} = \frac{\text{g polymer recovered}}{\text{g lignin added} + \text{g monomer added}}$$

It is preferred that all reagents used be of reagent grade purity but less pure materials may be used if they do not contain inhibitors for the reaction. Any oxygen-containing gas can be used to treat the 1,4-dioxane before irradiation, but oxygen is preferred. Different light sources can be used to irradiate the 1,4-dioxane but it is useful to have a significant or substantial fraction of the light in the range of 200 to 500 nm wavelength. It is preferred that at least 50% of the light be in this wavelength range. Other concentrations of cerium (+IV) ion solution in other nonreactive solvents can be used to add this reagent to the reaction. The 0.05 M cerium (+IV) sulfate solution in 1M sulfuric acid is stable and convenient to use, however. Other changes in this procedure, evident to those skilled in synthesis or chemical manufacture can be made.

The graft copolymer can also be produced by using the isolated autooxidation product of 1,4-dioxane as an initiator in another solvent. The autooxidation product is prepared by refluxing 250 mL of freshly distilled 1,4-dioxane while bubbling the contents of the reflux vessel with air at a rate of 4.3 ml/s. Again, the optimum duration for this treatment must be determined by titrating aliquots refluxed and bubbled for different times to determine the oxidizing agent concentration as a function of time. Optimum time is usually 12 to 14 hours After refluxing and aerating 1,4-dioxane for the optimum time, unreacted dioxane is removed at about 0.27 KPa nitrogen pressure and about 23° C. temperature. The isolated white solid is stored at 4° C. in a refrigerator The white solid contains a high fraction of 2-hydroperoxy-1,4-dioxacyclohexane, an initiator of graft copolymerization. The solid may also contain 2,3-bishydroperoxy-1,4-dioxacyclohexane, which may also assist in initiating the graft copolymerization. Other hydroperoxides, such as hydrogen peroxide or t-butyl hydroperoxide, may be used in place of the white solid or the pure 1,4-dioxane hydroperoxides listed above.

Synthesis Method 2

The grafting reaction is run by adding lignin and calcium chloride to a nitrogen-flushed 125 mL flask containing 20 mL of solvent. The mixture is bubbled with nitrogen for about 3 minutes, oxidation products of dioxane or a pure hydroperoxide are added, and the flask contents are bubbled with nitrogen for about 2 more minutes. Flask contents were stirred for about 20 minutes and bubbled with nitrogen for about 4 minutes. A nitrogen-saturated mixture of 2-propenamide and sodium 2,2-dimethyl-3-imino-4-oxohex-5-ene-1-sulfonate in solvent is then added with the flask contents being bubbled with nitrogen for about 10 minutes while being stirred. Then, 0.15 mL of 0.05 cerium (+IV) sulfate in 1 M aqueous $H_2SO_4$ is added. The sample is stirred and bubbled for 10 more minutes, and is then capped with a septum stopper. The volume of solvent in the monomer mixture is usually about 10 mL.

After 2 days of storage in a 30° C. constant temperature bath, the reaction is terminated and the product is recovered as previously described. To obtain a higher purity product which is more readily soluble, the reaction product is recovered from nonsolvent by filtration and redissolved in water. The aqueous solution is dialyzed against pure water using a 3,500-upper-molecular-weight-permeable, dialysis membrane for several days. The aqueous solution containing the solid is then freeze-dried.

The concentration of the ceric sulfate solution used can vary from about 0.01 M to 0.3 M. Other reagents that may be used in place of ceric ion ($Ce^{4+}$) include vanadium ($V^{+5}$) or manganese ions ($Mn^{3+}$, $Mn^{4+}$, $Mn^{7+}$). It is preferred that the metal salt be added as an acidic aqueous solution. Moreover, ceric salts are a preferred reagent for the graft polymerization. The reaction can be run without adding cerium or other oxidizing metal ions but slightly higher yields and better solubility properties are obtained when the oxidizing metal ion is added.

The graft copolymerization reaction can be conducted with or without stirring once the monomer and metal salt have been dispersed in the reaction mixture. The reaction is allowed to proceed for 1 to 200 hours, with 48 hours being a typical reaction time. It is preferred to terminate the copolymerization by addition of a free radical scavenger such as hydroquinone.

The graft terpolymer is easily recovered from a liquid reaction mixture. If the reaction mixture is a gel or thick slurry, it can be made pourable by mixing therewith 1 to 3 times its volume of distilled or deionized water under low shear conditions until a homogeneous, pourable system is formed. The reaction mixture is added to 2–20, preferably 5–10, times its volume of a nonsolvent for the polymer, such as 2-propanone. Preferably the nonsolvent is stirred vigorously so as to form a vortex and the copolymer solution is slowly drained directly into the center of this vortex. The precipitated graft copolymer is then removed from the nonsolvent solution by filtration, washed with nonsolvent, filtered, and vacuum-dried to a constant weight. A purer product can be obtained by the dialysis-freeze drying process described above.

The following examples illustrate certain embodiments of this invention wherein parts and percentages are by weight and temperatures are in centigrade unless otherwise indicated. Indulin AT, a commercial lignin product of the Westvaco Corporation, and Eastman reagent-grade 2-propenamide were used in these syntheses. Sodium 2,2-dimethyl-3-imino-4-oxohex-5-ene-1-sulfonate (special process reaction grade II) was obtained from the Lubrizol Corporation of Cleveland, Ohio, and was purified by recrystallization in methanol before use. Paradioxane and dimethyl sulfoxide, of reagent grade, from Mallinckrodt Chemical Company and anhydrous calcium chloride also therefrom were used in these experiments. Ceric sulfate solution was prepared from reagent grade ceric sulfate, sulfuric acid, and distilled water. The hydroquinone solution was 1 wt % hydroquinone in distilled water.

The present invention will now be further illustrated by certain examples and references which are provided for purposes of illustration only and are not intended to limit the present invention.

EXAMPLES

Example 1

A total of 0.5 g of lignin and 0.5 g of calcium chloride were placed in a 125 mL erlenmeyer flask containing 20 mL of dimethylsulfoxide. The mixture was stir-bubbled with nitrogen ($N_2$) for about 2 minutes before 0.15 g of 1,4-dioxane autooxidation products, previously prepared and separated as already described, were added to the reaction mixture. $N_2$ was bubbled through the reaction mixture for about 2 more minutes, the system was stirred for about 20 minutes, and 1.6 g of 2-propenamide (I) was then added. After about 2 minutes of stirring and $N_2$ bubbling, 4.66 g of sodium 2,2-dimethyl-3-imino-4-oxohex-5-ene-1-sulfonate (II) was added. After about 10 minutes of stirring and bubbling $N_2$ through the reaction mixture, the flask was stoppered and stirred at room temperature for 1 day. It was then placed in a 30° C. bath for 1 day. The reaction was then terminated by adding 0.5 mL of 1% hydroquinone and 100 mL of water thereto. The stirred reaction mixture was precipitated in 1 of 2-propanone and recovered by filtration. The recovered solid was dissolved in 100 mL of water and dialyzed against water for 3 days. The dilute reaction product in the dialysis tube was recovered by freeze drying and found to weigh 4.74 g. The product was labeled 17-122-1. Yield=70.1 wt %. Weight percent sulfur in the product was 9.78%.

Example 2

A total of 4.66 g of II was placed in 20 mL of dimethylsulfoxide and stirred until dissolved. The solution was purged with $N_2$ for about 3 minutes. Lignin in the amount of 0.5 g and 0.5 g of calcium chloride were placed in 10 mL of dimethylsulfoxide and treated as in Example 1. As in Example 1, 0.15 g of 1,4-dioxane autooxidation products were added to the sample and, after about 3 minutes of $N_2$ purge, it was capped and stirred for about 20 minutes. The reaction flask was then opened and 1.6 g of I were added under $N_2$ purge. After stirring for about 3 minutes with $N_2$ purge, the solution of II described above was added to the reaction flask. After about 10 more minutes of stirring and $N_2$ purge, 0.15 mL of 0.05 M $Ce^{4+}$ in 1 M $H_2SO_4$ were added, the flask was capped under $N_2$, and the reaction vessel placed in a 30° C. bath for 2 days. The reaction was then terminated as in Example 1; precipitated, dialyzed, and freeze dried as in Example 1. A yield of 5.88 g or 86.98 wt % of total solids was obtained. The product was labeled 17-124-A. The product of this example had a lignin content of 3.69 wt %, a nitrogen content of 8.95 wt. %, and a limiting viscosity number of 1.58 dL/g using the Fuoss Equation. See *J. Poly. Sci.*, 3,603–04 (1948). Weight percent sulfur in the product is 9.54%. Calcium content of product was 2.17 wt. %.

Example 3

A sample of graft terpolymer was made by the procedure given in Example 2. The amounts of reactants used were lignin=0.50 g, calcium chloride=0.50 g, I=1.60 g, II=4.66 g, 1,4 dioxane autooxidation products=0.25 g, cerium (+IV) solution=0.15 mL, and dimethylsulfoxide solvent=30 mL total (20 mL + 10 mL). Yield of product was 5.30 g or 78.4 wt. %. Nitrogen content of product was 9.10 wt. %, lignin content was 3.78 wt. %, sulfur content was 9.19 wt. %, and limiting viscosity number was 1.31 dL/g. Sample was labeled 17-126-B. Calcium content of product was 2.14 wt. %.

Example 4

A sample of graft terpolymer was made by the procedure given in Example 2. The amounts of the reactants used were lignin=0.50 g, calcium chloride=0.50 g, I=1.60 g, II=4.66 g, 1,4-dioxane autooxidation products=0.40 g, cerium (+IV) solution=0.15 mL, and dimethylsulfoxide solvent=30 mL (20 mL+10 mL). Yield of product was 4.72 g or 69.8 wt. %. Assay results were lignin=4.13 wt. %, nitrogen=8.85 wt. %, calcium=4.13 wt. %, and sulfur=9.23 wt. %. Limiting viscosity number was 1.36 dL/g. Sample was labeled 17-128-C.

Example 5

A graft terpolymer sample was made by the procedure given in Example 2. The amounts of reactants were: lignin=0.50 g, I=1.60 g, II=5.16 g, 1,4-dioxane autooxidation products=0.15 g, cerium (+IV) solution=0.15 mL, and dimethylsulfoxide solvent % 30 ml. Yield of product was 5.72 g or 78.79 wt. %. Assay results were: lignin=3.44%, nitrogen=8.94%, sulfur=8.61%, and calcium=2.09%. Limiting viscosity number was 1.5 dL/g and the sample number assigned was 17-132-1.

Example 6

A sample of graft terpolymer was made by the procedure of example 2. The amounts of reactants were: lignin=0.50 g, I=1.60 g, II=5.16 g, dimethylsulfoxide solvent=30 mL, calcium chloride=0.50 g, cerium (+IV) solution=0.15 mL, and 1,4-dioxane autooxidation products=0.15 g. During the purification of this reaction product, it was dialyzed for 1 day against 0.01 M HCl and for 1 day against pure water before freeze drying. Yield of product was 5.61 g or 77.3 wt. %. Assay results were lignin=3.04%, nitrogen=8.92%, sulfur=9.95%, and calcium=2.17%. Limiting viscosity number of the product in water at 30° C. was 1.49 dL/g and the sample number assigned was 17-134-2.

Example 7

A sample of graft terpolymer was made by the procedure given in Example II. Again, this sample was dialyzed for a total of 5 days using acid for one day as described in Example 6. The amounts of reactants used were: lignin=0.50 g, I=1.60 g, II=4.66 g, dimethylsulfoxide solvent=30 mL, cerium (+IV) solution=0.15 mL, calcium chloride=0.50 g, and 1,4-dioxane autooxidation products=0.15 g. Yield of product was 5.90 g or 87.3 wt %. Assay results were lignin=4.15%, nitrogen=8.61%, sulfur=10.29%, and calcium=1.94%. Limiting viscosity number was 1.56 dL/g, and the sample number 17-136-3 was assigned.

Example 8

A sample of 1.87 g of II was placed in 18 mL of dimethylsulfoxide and dissolved. The solution was purged with $N_2$ for 10 minutes and capped. Into 12 mL of dimethylsulfoxide in a 125 mL erlenmeyer flask was placed 0.5 g of lignin and 0.50 g of calcium chloride. After dissolving these two reactants, the lignin solution was bubbled with $N_2$ for about 4 minutes and 0.39 mL of an aqueous solution of 3,3-dimethyl-1,2-dioxybutane ($6.80 \times 10^{-4}$ equivalents/g) was added. This latter compound is commonly known as t-butylhydroperoxide. The lignin solution was stirred and bubbled with $N_2$ for 5 minutes and was capped. The solution of II prepared above and a beaker containing 2.58 g of I were purged with $N_2$ for 10 minutes. The solid I and the solution of II were then poured into the reaction flask while $N_2$ was passed into the lignin solution. Next, 0.15 mL of $Ce^{+4}$ solution was added by pipet, the flask was flushed with $N_2$, and it was sealed. The reaction flask was placed in a 30° C. bath for 2 days and then the reaction was terminated as in Example II. Purification of the product was done as in example II. Yield of product was 3.34 g or 67.9 wt %. The sample was labeled 19-18-1. The nitrogen flow rate during bubbling in this example was 0.5 mL per minute.

Example 9

A grafting reaction using the procedure of Example 8 was run. Virtually all steps in this synthesis were the same save that the nitrogen bubbling rate for this synthesis was higher. The $N_2$ flow rate used here was 2.0 mL per minute. The solution of II was made from 1.86 g of II and 19.61 g of dimethylsulfoxide. The lignin solution contained 0.50 g of lignin, 0.53 g of calcium chloride, and 13.05 g of dimethylsulfoxide. The 2-propenamide (I) was added as a solid and weighed 2.56 g. Yield of the reaction was 3.91 g or 79.5 wt. %. This was sample 19-19-1.

Example 10

A grafting reaction was run using the conditions and procedures of Example 9. The amounts and volumes of reactants used were lignin=3.57 g, calcium chloride=3.55 g, cerium(+IV) solution=1.05 mL, I=17.99 g, II=12.96 g, dimethylsulfoxide solvent=125.05 g for II and 78 g for lignin, and 3,3-dimethyl-1,2-dioxybutane (70% aqueous solution, see example 8)=2.72 ml. The total ratio of solid additives to solvent was increased in this reaction in an attempt to produce a higher molecular weight product. The dialyzed, product solution from this reaction was mixed with that from Example 11 to form one sample of product.

Example 11

A grafting reaction was run using the procedure of Example 9. The amounts or volumes of reagents were: lignin=4.39 g, calcium chloride=4.35 g, dimethylsulfoxide as lignin solvent=91.7 g, II=15.99 g, dimethylsulfoxide as II solvent=144.54 g, I=21.98 g, cerium (+IV) solution=1.28 mL, and 3,3-dimethyl-1,2-dioxybutane=3.35 mL. After dialysis, the fluid containing solid from this reaction and that from Example 10 were combined to make one sample for freeze drying. Total yield of both reactions was 69.72 g or 91.02 wt %. These solids were sample 19-26-1.

The limiting viscosity numbers of the products produced in these examples was between 1 and 2 dL/g. This shows that these materials are effective viscosifiers for water. This is further demonstrated by the data of Table 1 which shows that additions of only 1 wt % or less of the present graft copolymer to water doubles or triples the viscosity thereof.

TABLE 1
VISCOSITIES OF AQUEOUS SOLUTIONS OF GRAFT TERPOLYMER

| PRODUCT FROM EXAMPLE NUMBER | SAMPLE NUMBER | *VISCOSITY WHEN PRODUCT CONCENTRATION IN SOLUTION IS (wt. %): | | | | |
|---|---|---|---|---|---|---|
| | | 1.0 | 0.8 | 0.6 | 0.4 | 0.2 |
| 2 | 17-124-A | 2.92 | 2.65 | 2.42 | 2.10 | — |
| 3 | 17-126-B | 2.82 | 2.57 | 2.30 | 2.01 | — |
| 4 | 17-128-C | 2.76 | 2.53 | 2.28 | 2.00 | — |
| 5 | 17-132-1 | 2.84 | 2.59 | 2.34 | 2.08 | — |
| 6 | 17-134-2 | 2.90 | 2.65 | 2.38 | 2.09 | — |
| 7 | 17-136-3 | 3.03 | 2.76 | 2.51 | 2.15 | — |

*All viscosities are in centipoise, the temperature of the solution is 30° C., and all solutions were made in distilled water. Viscosity of pure water at 30° C. = 0.7975 cp.

As already noted, the grafted side chain or chains are made of random units of 2-propenamide and sodium 2,2-methyl-3-imino-4-oxohex-5-ene-1-sulfonate. Of course, suitable counter cations other than sodium, such as potassium or ammonium, are considered within the scope of the present invention. Moreover, the actual content of the grafted side chain or chains depends upon the molar ratio of monomer reactants employed. According to the present invention, it is acceptable to use from about 1 molar % to 99 molar % of 2-propenamide to about 99 molar % to 1 molar % of sodium 2,2-dimethyl-3-imino-4-oxohex-5-ene-1-sulfonate. However, it is preferable to use a molar % in the range of 20 to 80 or 80 to 20, respectively. The grafted side chain or chains occur at one or more of the 2-, 5- or 6- aromatic ring positions on the oxyphenylpropene moiety.

Of course the precise content of the grafted side chain or chains depends upon the contemplated use. For example, in uses where water solubility is required, more of the sulfonate monomer should be used. Conversely, where less ionic character is desired, more of the 2-propenamide monomer should be used.

The molecular weight of the water-soluble lignin copolymers of the present invention are in the range of about 40,000 to about 30,000,000 as determined by size exclusion chromatography using known techniques. Under the process conditions of the present invention already described, it is possible to obtain molecular weights of about 40,000 to 300,000. Under these conditions, the polymer molecular weight is generally increased by increasing the ratio of moles of monomer to moles of hydroperoxide. The converse is true when diminishing the molecular weight. However, by utilizing another aspect of the present invention, it has now been found possible to greatly boost or increase the molecular weight of the growing polymer during polymerization by conducting the reaction essentially in a gelated state.

Generally, the gelated state can be formed by essentially repeating the procedures already described for synthesizing the graft copolymer, but by reducing the amount of dimethylsulfoxide (DMSO) solvent by a factor of about 3. In other words, instead of using about 20 mL of solvent for the reaction as described in the Examples, about 5 or 6 mL are used instead. It has been theorized that by conducting the polymerization reaction in the gelated state, the propagation reaction continues, while the termination reaction is greatly diminished.

In general, the gelation occurs at room temperature with no heating being necessary. Reaction times are somewhat variable and on the order of from 1 to about 48 hours with the reaction in 1,4-dioxane going to completion in about 1 hour, while reaction in DMSO requires about 48 hours.

Although the polymerization reaction of the present invention is a free-radical polymerization, the scope of the present invention clearly extends the concept of gel-state reactions to other types of polymerization reactions such as ionic or chain polymerizations.

The water-soluble lignin graft copolymer of the present invention is advantageously used as a thickening agent for water or aqueous solutions and can be used in the preparation and use of drilling fluid compositions. In this respect, U.S. Pat. Nos. 3,985,659, 4,322,301 and 4,341,645 are herein incorporated by reference in their entirety.

The water-soluble lignin graft copolymers of the present invention can also be used advantageously in a conventional manner for the enhanced recovery of oil in subterranean wells. Typically in such processes, the graft copolymer is dispersed or solubilized in injection water, the water is then injected into the subterranean formation, and the injected water is then moved through the formation acting as a hydraulic ram, thereby pushing the resident oil to a production well. It is noted that the particular amounts of the present lignin graft copolymer effective for such use as well as other particulars of this use would be within the ambit of one skilled in the art having read the present disclosure.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A water-soluble graft copolymer of lignin-(2-propenamide)-(sodium 2,2-dimethyl-3-imino-4-oxohex-5-ene-1-sulfonate) having a central lignin network and at least one grafted side chain, R, having randomly repeating units of 2-propenamide, having the formula (I), in the amount of from about 1-99 molar %, and of sodium 2,2-dimethyl-3-imino-4-oxohex-5-ene-1-sulfonate having the formula (II), in the amount of from about 99-1 molar %:

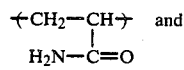 (I)

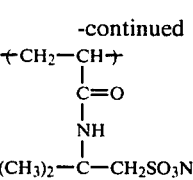 (II)

such that the central lignin network has a molecular weight of about 1,000 to 100,000 and the total number of randomly repeating units in the grafted side chain or chains is in the range of 1,000 to 300,000 units, such that the total graft copolymer molecular weight is in the range of 40,000 to 30,000,000.

2. The water-soluble graft copolymer according to claim 1, wherein the lignin used as the central network is an alkali lignin, a HCl lignin, a milled-wood lignin or a 1,4-dioxane lignin.

3. The water-soluble graft copolymer according to claim 2, wherein said lignin is an alkali lignin.

4. The water-soluble graft copolymer according to claim 3, wherein said graft copolymer has the following unit formula:

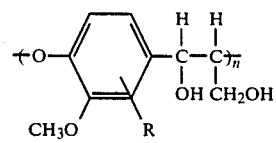

wherein n is defined such that the central lignin network has a molecular weight of about 1,000 to 100,000; and wherein said grafted side chain, R, has randomly repeating units of 2-propenamide, having the formula (I), in the amount of from about 1–99 molar %, and of sodium 2,2-dimethyl-3-imino-4-oxohex-5-ene-1-sulfonate, having the formula (II), in the amount of from about 99-1 molar %:

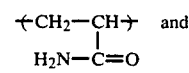 (I)

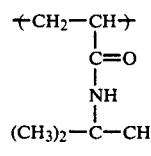 (II)

such that the total numbers of randomly repeating units in the grafted side chain or chains is in the range of 1,000 to 300,000, such that the total copolymer molecular weight is in the range of 40,000 to 30,000,000.

5. The water-soluble graft copolymer according to claim 1, wherein the molecular weight is determined by size exclusion chromatography.

6. The water-soluble graft copolymer according to claim 1, wherein said grafted side chain, R, has randomly repeating units of 2-propenamide in the amount of about 20 to 80 molar %, and of sodium 2,2-dimethyl-3-imino-4-oxohex-5-ene-1-sulfonate, in the amount of from about 80 to 20 molar %.

* * * * *